3,261,426
AIRLINE LUBRICATOR
Walter F. Kuhlman, 99 Corwin St., Norwalk, Ohio
Filed Aug. 9, 1963, Ser. No. 301,097
9 Claims. (Cl. 184—55)

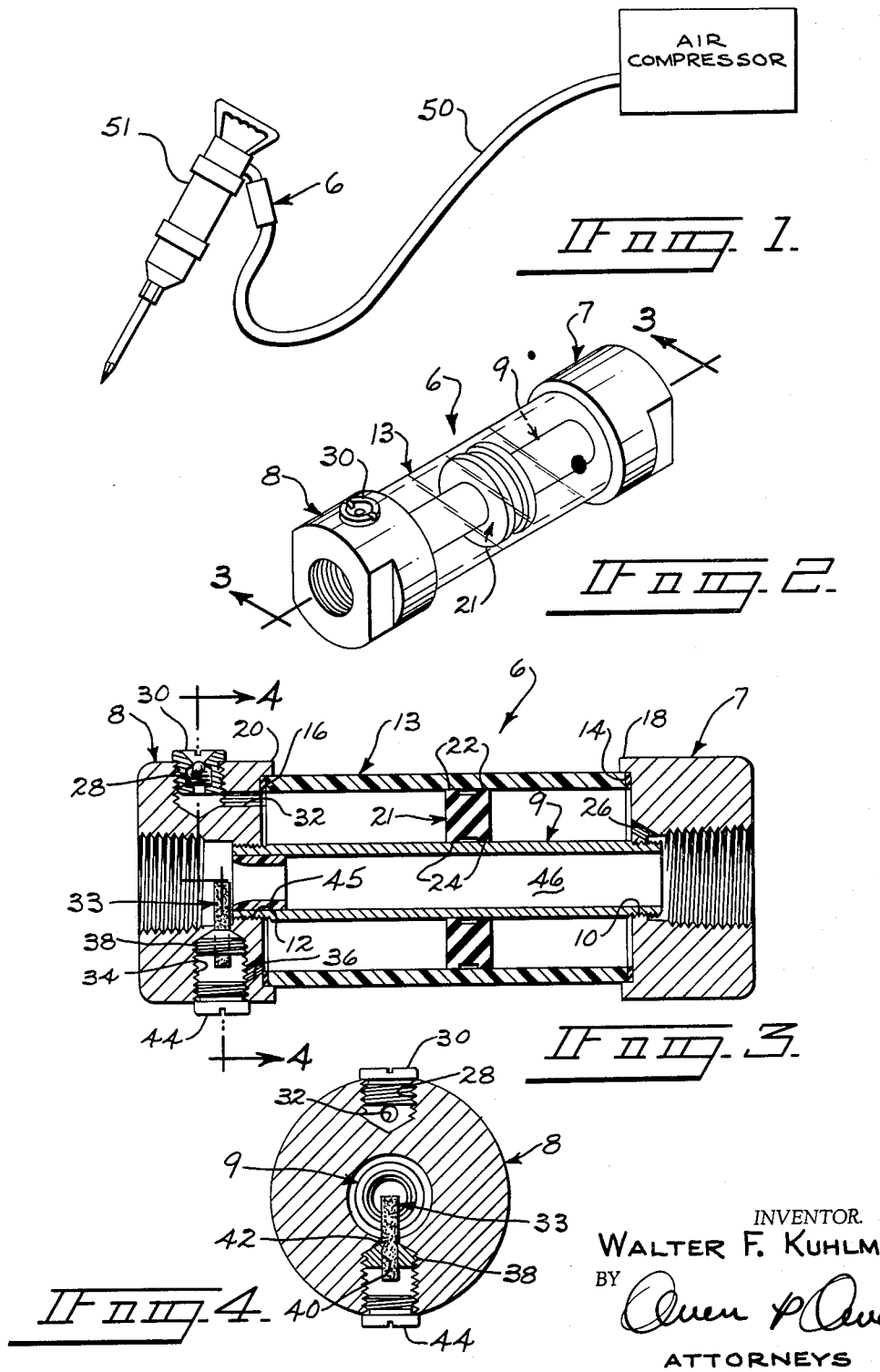

The present invention relates to means for introducing a lubricant into a flowing stream of a fluid, and, more particularly, to a lubricating device adapted to be installed in the air supply line leading to a pneumatic tool.

It is an object of the invention to provide a new and improved air line lubricator which efficiently introduces a lubricant into an air stream without the use of an external power supply for forcing the lubricant into the air stream, and which causes but a minimum of pressure drop in the air stream.

A further object of the invention is the provision of a new and improved air line lubricator of the above described type which: is simple in its construction in any attitude or position, and is operable, compact and of light weight, so that it can be placed directly in the air supply line leading to a pneumatic hand tool or the like.

The invention resides in certain constructions, and combinations, and arrangements of parts; and further objects and advantages of the invention will become apparent to one skilled in the art to which it relates from the following description of a preferred embodiment described with reference to the accompanying drawing forming a part of this specification, and in which:

FIG. 1 is a view in elevation of an airline lubricator according to the invention and an associated pneumatic tool;

FIG. 2 is an isometric view of a lubricator according to the invention;

FIG. 3 is a cross-sectional view taken approximately on the plane 3—3 of FIG. 2; and FIG. 4 is a view in cross section taken approximately on the line 4—4 of FIG. 3.

An airline lubricator according to the invention is indicated generally in the drawings at 6. The lubricator 6 has inlet and outlet caps 7 and 8, respectively (see FIG. 3, in particular) which are held apart in axially spaced relationship by means of an inner tubular member 9, the opposite ends of which are threaded into axially extending openings 10 and 12 in the respective end caps 7 and 8. Prior to being threaded into tight sealing relationship, an outer tubular member 13 is positioned over the tubular member 9; and annular gaskets 14 and 16 are positioned between opposite ends of the outer tubular member 13, and the respective end caps 7 and 8. Upon screwing the end caps onto the inner tubular member 9 the gaskets 14 and 16 are compressed between the outer member and the respective end caps. The end caps 7 and 8 are provided with axially extending flanges 18 and 20, respectively, which fit over the ends of the outer tubular member 13, and hold the respective gaskets in place.

Prior to assembly an annular piston 21 preferably made of a plastic, such as nylon or teflon, is positioned in the annular space between the inner and outer tubular members 9 and 13 to effect a suitable seal with the surfaces thereof. The annular piston 21 may be provided with suitable lips as at 22 and 24 in order to aid in effecting a sliding seal.

In the embodiment shown in the drawings, the openings 10 and 12 in the respective inlet and outlet end caps 7 and 8 extend axially through the respective end caps and are suitably threaded to receive pipe nipples (not shown) by means of which the lubricator is attached to the air supply line leading to a hand tool. A small opening 26 is provided between the inlet opening 10 and the annular space between the inlet end cap 7 and the annular piston 21, so as to place inlet air pressure upon the right hand side of the piston 21 as seen in FIG. 3. The opposite side of the piston 21 that is the side between the outlet end cap 8 and the piston 21, is adapted to be filled with oil or other suitable lubricant. This latter space may be filled in any suitable manner, for example, through a lateral opening 28 in the outlet cap 8 which communicates with the adjacent end of the annular space between the inner and outer tubes 9 and 13 through a short, longitudinally extending passageway 32. The opening 28 is suitably closed by means of a flush type threaded pressure grease fitting 30.

Lubricant that is added to the annular space between the inner and outer tubes 9 and 13 in the region adjacent the outlet cap 8 can be introduced into a stream of air passing through the inner tube 9 in any convenient manner. This is most effectively done by means of a wick 33 which extends laterally across the outlet end of the tube 9. Lubricant from the annular space adjacent the piston 21 is delivered to the wick through a lateral opening 34 and an inter-connecting opening 36. The wick 33 is held in a wick bushing 38 which has a central opening 40 therethrough, through which the wick 33 extends, as clearly shown in FIGURES 3 and 4. A crimped flange 42 extends over one end of the central opening 40 and reduces the area of the opening 40 so that the wick is gripped by the flange 42. The wick bushing 38 is threaded into the opening 34, so that the wick may be positioned laterally across the opening of the tube 9 to regulate the amount of lubricant which is added to the air flowing through the device. The opening 34 is closed by a threaded plug 44.

While, in some instances, the pressure drop through the inner tube 9 is sufficient to cause the necessary pressure difference to actuate the piston 21, greater efficiency and greater flexibility can be had by making the tube 9 of a large size and providing an orifice 45 in a passage 46 through the tube 9. The orifice 45 serves the function of producing a predetermined pressure drop across the piston 21 to force oil out through the wick 33. In the embodiment shown in the drawings, the orifice 45 is merely pressed into the passage 46 of the inner tube 9 so that it can be easily removed and replaced by another one having an opening of a different size. This enables the airline lubricator to be adapted easily for service with a tool requiring any given proportion of lubricant.

In the normal operation the airline lubricator 6 will be installed as shown in FIG. 1 in a flexible hose 50 that leads from a suitable source of high pressure air, such as an air compressor, to a hand tool 51. Prior to turning on the air supply, a lubricant will be forced through the fitting 30 to displace the piston 21 to the right side adjacent the inlet cap 7. Thereafter compressed air can be supplied to the lubricator 6 and the hand tool 51 placed in service since the Zirk fitting 30 will prevent the escape of pressure fluid.

The air pressure in the opening 10 is communicated through the opening 26 to the right side of the piston 21. A pressure drop occurs as a consequence of air flow through the central opening 46 of the inner tube 9 and the orifice 45, so that the pressure adjacent the wick is slightly lower than the right hand side of the piston 21. This causes lubricant to flow through the openings 36 and 34 and to seep through the wick 33 from whence it is picked up by air issuing from the central opening of the orifice 45. As lubricant is displaced from the left hand side of the piston 21, differential pressure thereacross causes it to move to the left until it reaches a position adjacent the outlet cap 8 from which it can no longer force lubricant into the air stream. In the preferred embodiment shown in the drawing, the outer tube 13 is a translucent plastic material so that the position of the piston 21 can be checked visually and the lubricator 6 can be refilled prior to the time that the piston 21 reaches the end of its stroke. The construction of the present invention has the further advantage in that the lips 22 of the piston 21 slide over the inside surface of the plastic outer tube 13 as fluid is displaced therefrom to provide a wiping and cleaning action. Clean surfaces of the tube 13 are therefore provided at each filling of the lubricator, so that better visibility of the oil can be had in the present device than in the prior art bowl type lubricators.

It will be apparent that the objects heretofore enumerated as well as others are accomplished, and that a lubricator having many advantages over the prior art has been provided. It will be seen that the lubricator 6 does not need a source of external power in order to force the lubricant into the system, and that the lubricator creates but a small pressure drop to positively inject the fluid lubricant into the passing air stream. The pressure drop is created without causing a change in direction in the air flow as it passes through the lubricator, and, as a consequence, the lubricator can be made small, and compact. What is more, the lubricator can be installed in the flexible line leading to a hand tool, inasmuch as it will function properly no matter how the lubricator is positioned, and lubricant will flow only so long as a stream of air passes therethrough. In addition, the lubricator may be held together by the central tube through which the air stream passes, and the outer tube, which forms the reservoir, may be of a translucent material so that the amount of lubricant which remains at any time can be observed readily.

While the invention has been described in considerable detail, it is not limited to the particular embodiment shown and described, and it is intended to cover hereby all novel adaptations, modifications, and arrangements thereof which come within the spirit and scope thereof as defined in the appended claims or within the practice of one skilled in the art to which the invention relates.

What I claim is:

1. An airline lubricator comprising: an inlet cap having an axially extending opening therein, an outlet cap having an axially extending opening therein, said caps being spaced axially apart, an axially extending inner tube connecting said spaced apart caps, and having a central passage communicating with the opening in said inlet cap and with the opening in said outlet cap, an outer tube sealed between said inlet and outlet caps, said outer tube concentric with said inner tube, an annular piston sealingly positioned between said inner and outer tubes, the opening in said inlet cap being in communication with the annular space between said tubes on the side of said piston adjacent said inlet cap, and the opening in said outlet cap being in communication with the annular space between said tubes on the opposite side of said piston, and means for filling the annular space on the opposite side of said piston with oil, whereby air flowing through the opening in said inlet cap, through the passage of said inner tube and from the central opening in said outlet cap applies a differential pressure across said piston which forces oil into the opening of said outlet cap for mixture with the air flowing therefrom.

2. An airline lubricator comprising: an inlet cap having an axially extending opening therein, an outlet cap having an axially extending opening therein, said caps being spaced axially apart, an axially extending inner tube connecting said spaced apart caps, and having a central passage communicating with the opening in said inlet cap and with the opening in said outlet cap, an outer translucent tube sealed between said inlet and outlet caps, said outer tube being concentric with said inner tube, an annular piston sealingly positioned between said inner and outer tubes, the opening in said inlet cap being in communication with the annular space between said tubes on the side of said piston adjacent said inlet cap, and the opening in said outlet cap being in communication with the annular space between said tubes on the opposite side of said piston, and means for filling the annular space on the opposite side of said piston with oil, whereby air flowing through the opening in said inlet cap, through the passage of said inner tube and from the central opening in said outlet cap applies a differential pressure across said piston which forces oil into the opening of said outlet cap for mixture with the air flowing therefrom.

3. An airline lubricator comprising: an inlet cap having an axially extending opening within threaded sidewalls, an outlet cap having an axially extending opening within threaded sidewalls, said caps being spaced axially apart, an axially extending inner tube having its opposite ends threaded into the side walls of said inlet and outlet caps, and having a central passage comunicating with the opening in said inlet cap and with the opening in said outlet cap, an outer tube sealed between said inlet and outlet caps, said outer tube being concentric with said inner tube, an annular piston sealingly positioned between said inner and outer tubes, the opening in said inlet cap being in communication with the annular space between said tubes on the side of said piston adjacent said inlet cap, and the opening in said outlet cap being in communication with the annular space between said tubes on the opposite side of said piston, and means for filling the annular space on the opposite side of said piston with oil, whereby air flowing through the opening in said inlet cap, through the passage of said inner tube and from the central opening in said outlet cap applies a differential pressure across said piston which forces oil into the opening of said outlet cap for mixture with the air flowing therefrom.

4. An airline lubricator comprising: an inlet cap having an axially extending opening therein, an outlet cap having an axially extending opening therein, said caps being spaced axially apart, an axially extending inner tube connecting said spaced apart caps, and having a central passage communicating with the opening in said inlet cap and with the opening in said outlet cap, an outer tube sealed between said inlet and outlet caps, said outer tube being concentric with said inner tube, an annular piston sealingly positioned between said inner and outer tubes, the opening in said inlet cap being in communication with the annular space between said tubes on the side of said piston adjacent said inlet cap, and the opening in said outlet cap being in communication with the annular space between said tubes on the opposite side of said piston, a wick extending into the opening of said outlet cap and in communication with the annular space between said tubes on the opposite side of said piston and means for filling the annular space on the opposite side of said piston with oil, whereby air flowing through the opening in said inlet cap, through the passage of said inner tube and from the central opening in said outlet cap applies a differential pressure across said piston which forces oil into the wick for mixture with the air flowing from said outlet cap.

5. An airline lubricator comprising: an inlet cap and an outlet cap, said caps being held in spaced apart relationship by an inner tubular member that is threaded into each of said caps, said tubular member having an axially extending passageway therethrough and each of said caps having axially extending openings therein communicating with respective ends of said tubular member, an outer tubular member coaxially positioned with respect to said inner tubular member and sealed between said inlet and outlet caps, an annular piston in sealing relationship between said inner and outer tubular members, orifice means in the passageway of said inner tubular member adjacent said outlet cap, a wick in the opening of said outlet cap extending generally transversely across the end of the passageway of said inner tubular member, means for filling the annular space between said tubular members and between said outlet cap and piston with a lubricant, passage means providing communication from the annular space between said piston and said outlet cap to said wick, and passage means providing communication from the axially extending opening of said inlet cap to the side of said annular piston adjacent said inlet cap, whereby air flowing through the opening in said inlet cap through the passage of said inner tubular member and from the opening in said outlet cap is accelerated by said orifice means and impinges on said wick to induce distribution of lubricant throughout the air flow.

6. An airline lubricator comprising: an inlet cap having an axially extending opening therein, an outlet cap having an axially extending opening therein, said caps being spaced axially apart, an axially extending inner tube connecting said spaced apart caps and having a central passage communicating with the openings in said inlet and outlet caps, an outer tube sealed between said inlet and outlet caps and circumjacent said inner tube to form an annular cylinder therebetween, an annular piston within said cylinder, an air passage connecting said opening in said inlet cap with said annular cylinder on the side of said piston adjacent said inlet cap, and an oil passage in said outlet cap connecting said annular cylinder on the opposite side of said piston, and means for filling said annular cylinder on the opposite side of said piston with oil, whereby the pressure drop in the air flowing through said inlet cap, inner tube and outlet cap causes a greater pressure in said annular cylinder between said piston and said inlet cap than in said annular cylinder between said piston and said outlet cap, whereby said piston forces oil through said oil passage and into said outlet cap for mixture with the air flowing therefrom.

7. The airline lubricator of claim 6 which includes a pressure reducing orifice within said inner tube adjacent said outlet cap.

8. The airline lubricator of claim 6 including an oil wick in said oil passage extending transversely across said axial opening in said outlet cap.

9. The airline lubricator of claim 6 which includes a pressure reducing orifice within said inner tube adjacent said outlet cap and an oil wick in said oil passage extending transversely across said axial opening in said outlet cap adjacent the discharge side of said orifice.

References Cited by the Examiner

UNITED STATES PATENTS

| | | | |
|---|---|---|---|
| 1,091,776 | 3/1914 | Spitznas | 184—64 X |
| 2,105,493 | 1/1938 | Gartin | 184—55 |
| 2,229,176 | 1/1941 | Kehle | 184—64 X |
| 2,439,910 | 4/1948 | Snyder | 184—64 X |
| 2,472,170 | 6/1949 | Nash | 184—55 |
| 2,524,878 | 10/1950 | Boretti | 184—55 |
| 2,687,187 | 8/1954 | Lake | 184—55 |
| 2,865,469 | 12/1958 | Lyden | 184—55 |
| 2,945,560 | 7/1960 | Malec | 184—55 |
| 3,040,835 | 6/1962 | Ahnert | 184—55 |
| 3,182,860 | 5/1965 | Gallo | 222—145 |

LAVERNE D. GEIGER, *Primary Examiner.*

MILTON KAUFMAN, *Examiner.*

H. BELL, *Assistant Examiner.*